(12) United States Patent
Mazet et al.

(10) Patent No.: US 11,280,555 B2
(45) Date of Patent: Mar. 22, 2022

(54) METHOD FOR BRAZING OR REFILLING A PART WITH MICRO-INTERSTICES, AND HEAT EXCHANGER OBTAINED WITH SUCH A METHOD

(71) Applicant: STIRAL, Grenoble (FR)

(72) Inventors: Thierry Mazet, Nancy (FR); Pierre Billat, Grenoble (FR)

(73) Assignee: STIRAL, Grenoble (FR)

( * ) Notice: Subject to any disclaimer, the term of this patent is extended or adjusted under 35 U.S.C. 154(b) by 320 days.

(21) Appl. No.: 16/618,022

(22) PCT Filed: May 17, 2018

(86) PCT No.: PCT/EP2018/062864
§ 371 (c)(1),
(2) Date: Nov. 27, 2019

(87) PCT Pub. No.: WO2018/219661
PCT Pub. Date: Dec. 6, 2018

(65) Prior Publication Data
US 2020/0173727 A1    Jun. 4, 2020

(30) Foreign Application Priority Data
Jun. 1, 2017   (FR) ...................................... 1754864

(51) Int. Cl.
*F28D 9/00*        (2006.01)
*B23K 1/00*       (2006.01)
(Continued)

(52) U.S. Cl.
CPC .......... *F28D 9/0075* (2013.01); *B23K 1/0012* (2013.01); *B23K 1/19* (2013.01);
(Continued)

(58) Field of Classification Search
CPC ... F28D 9/0075; F28D 9/0025; B23K 1/0012; B23K 1/19; B23K 2103/05;
(Continued)

(56) References Cited

U.S. PATENT DOCUMENTS 10,788,274 B2    9/2020  Mazet et al.
2001/0032715 A1  10/2001 Peng
(Continued)

FOREIGN PATENT DOCUMENTS

JP    H0679446 A    3/1994

OTHER PUBLICATIONS

International Search Report for Application No. PCT/EP2018/062864, dated Oct. 5, 2018, European Patent Office, Rijswikj,NL.
(Continued)

*Primary Examiner* — Justin M Jonaitis
(74) *Attorney, Agent, or Firm* — B. Aaron Schulman, Esq.; Stites & Harbison, PLLC

(57) ABSTRACT

Method for brazing or refilling comprising the following steps:
  providing at least one part (51) containing a metal or metal alloy, for example stainless steel, the part (51) having at least one face (59) defining a plurality of interstices (61) comprising at least two opposite edges separated on the face (59) by a maximum distance of not more than 250 micrometres;
  obtaining a coating (R) in contact with said face and comprising at least a first layer (85), located at least partially in the interstices, and a second layer (87) adjacent to the first layer, the first layer (85) comprising a first powder (A) containing a metal or metal alloy, the second layer comprising a mixture of a second powder (B) and a third powder (C), the second powder and the third powder being, respectively, different alloys suit-
(Continued)

Figure 3:
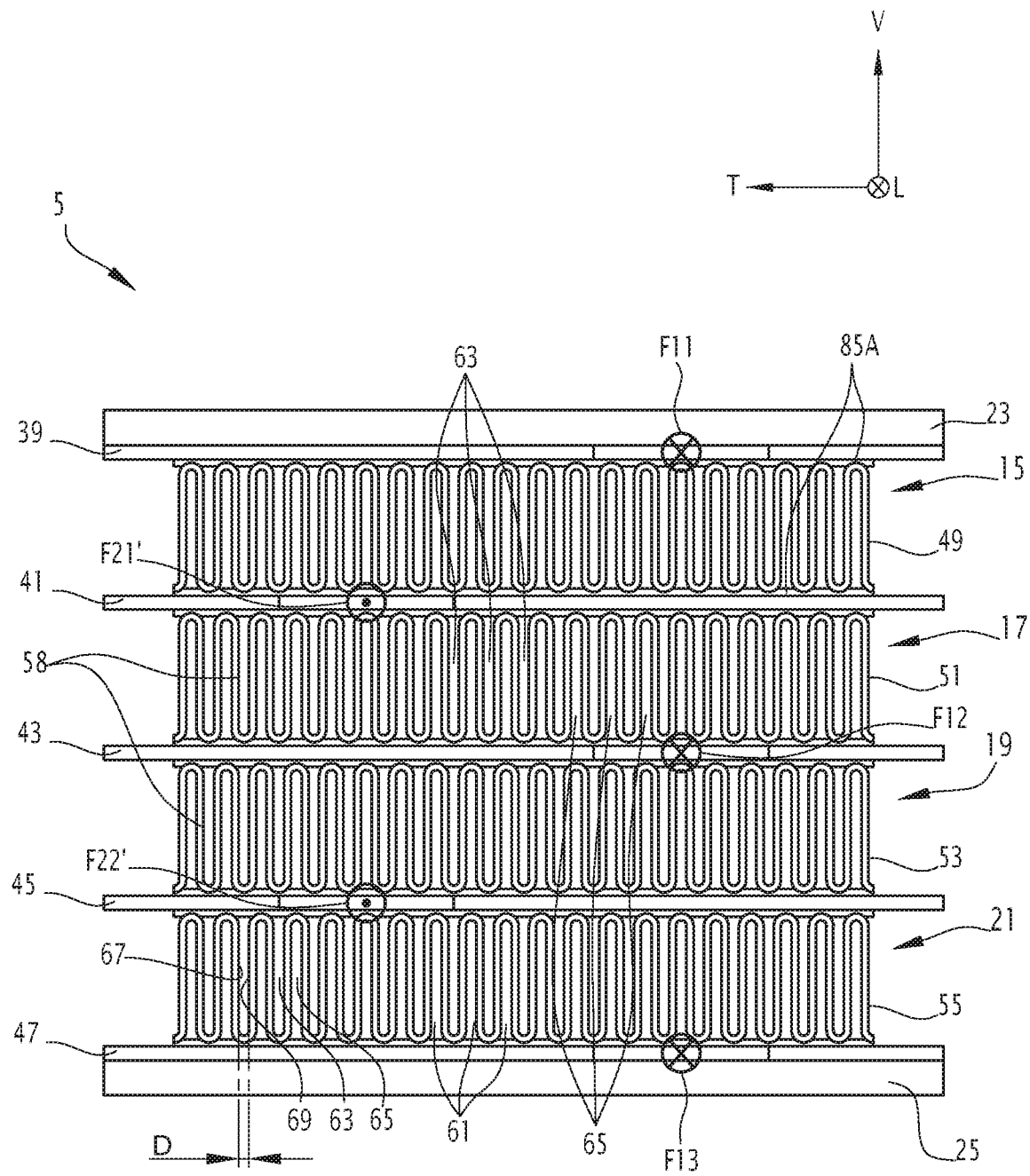

able for brazing or refilling the part, and the solidus temperature TSC of the third powder being lower than the solidus temperature TSB of the second powder;

heating the part and the coating at a heating temperature strictly lower than the solidus temperature TSA of the first powder, lower than the solidus temperature TSB, and strictly higher than the solidus temperature TSC, and at least partially melting the coating; and cooling the part and the coating to obtain a solidified residue attached to the part.

16 Claims, 4 Drawing Sheets

(51) Int. Cl.
    *B23K 1/19*    (2006.01)
    *B23K 103/04*    (2006.01)
    *B23K 101/14*    (2006.01)

(52) U.S. Cl.
    CPC ........ *F28D 9/0025* (2013.01); *B23K 2101/14* (2018.08); *B23K 2103/05* (2018.08); *F28F 2275/04* (2013.01)

(58) Field of Classification Search
    CPC ............ B23K 2101/14; B23K 2103/18; B23K 1/0014; F28F 2275/04
    USPC ........................ 165/167; 228/262.31; 29/890
    See application file for complete search history.

(56) References Cited

U.S. PATENT DOCUMENTS

| | | | |
|---|---|---|---|
| 2005/0072836 A1* | 4/2005 | Shabtay | F28D 1/0391 228/183 |
| 2017/0314879 A1* | 11/2017 | Mazet | F28F 19/06 |
| 2017/0320162 A1* | 11/2017 | Wang | G21C 13/087 |
| 2018/0297152 A1* | 10/2018 | Noguchi | B23K 35/0233 |
| 2020/0368852 A1* | 11/2020 | Ren | B23K 35/286 |

OTHER PUBLICATIONS

Preliminary Search Report for French Application No. FR 1754864, dated Feb. 9, 2018.

Written Opinion of the International Searching Authority for PCT/EP2018/062864, dated Oct. 5, 2018.

\* cited by examiner

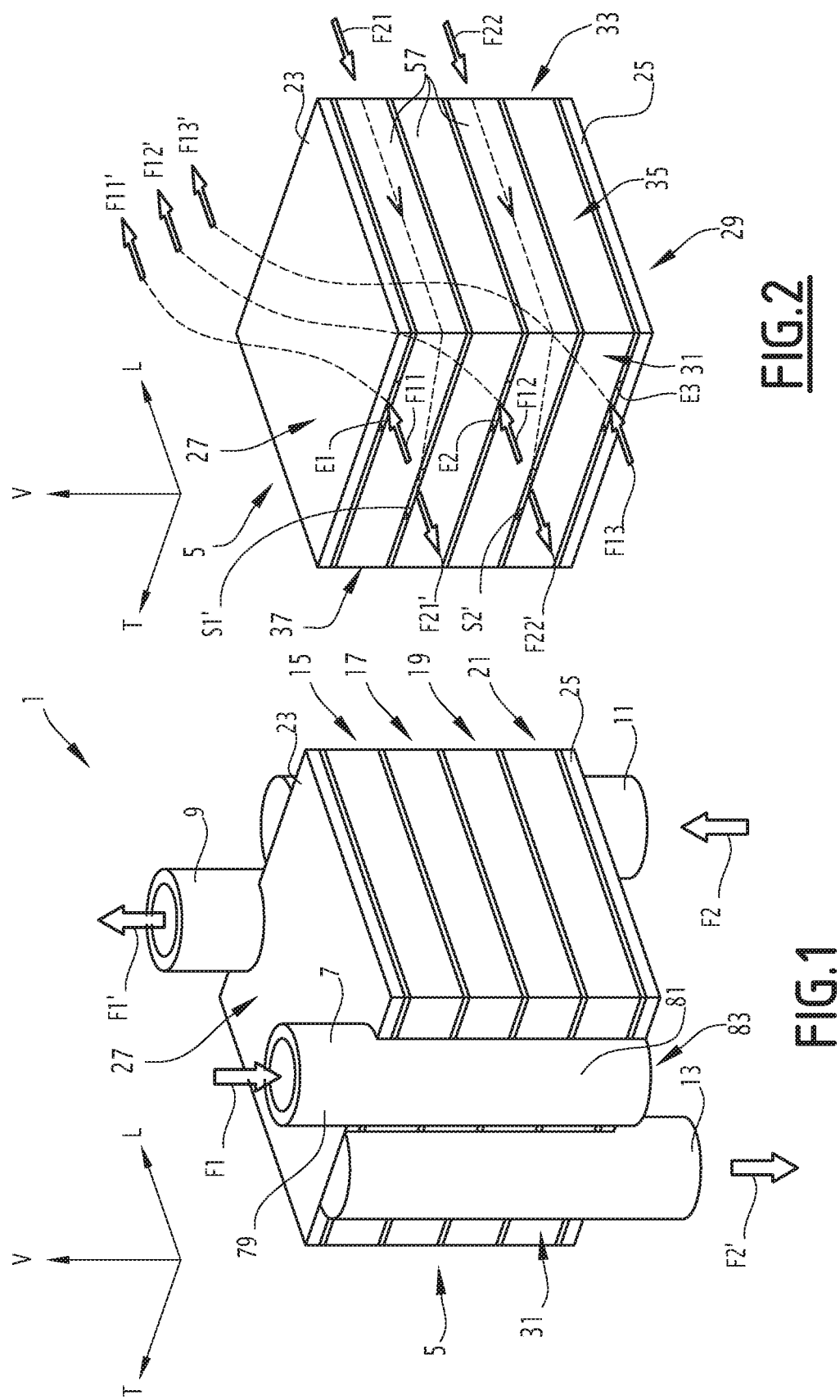

METHOD FOR BRAZING OR REFILLING A PART WITH MICRO-INTERSTICES, AND HEAT EXCHANGER OBTAINED WITH SUCH A METHOD

BACKGROUND OF THE INVENTION

Field of the Invention

The present invention relates to a method for brazing or refilling comprising a step for applying a coating on a part including interstices, heating with at least partial melting of the coating, and cooling to obtain a solidified residue fixed on the part.

The invention also relates to a heat exchanger thus obtained, the part then being an element defining circulation channels suitable for at least two fluids between which one wishes to perform a heat exchange.

Description of Related Art

It is well known to use brazing to assemble parts, in particular in order to assemble a heat exchanger or part of a heat exchanger.

Recharging makes it possible to contribute material, for example to consolidate or seal a surface.

Furthermore, a known type of heat exchanger implements a part made up of a metallic sheet folded on itself in an accordion. Two pieces of sheet metal fastened on either side of the metallic sheet define circulation channels that are locally parallel to a longitudinal direction and situated on each side of the metallic sheet. The longitudinal ends of the channels emerge on transverse faces of the accordion-folded sheet in which the channels define interstices.

The channels located on one side of the metallic sheet are traveled by a cold fluid, while those located on the other side are traveled by a hot fluid. Thus, between two pieces of sheet metal, two fluids circulate, separated from one another by the metallic sheet and exchanging heat with one another through the metallic sheet.

The accordion-folded sheets and the pieces of sheet metal covered on both of their faces with a brazing film are alternatively stacked on one another so as to form a block called "matrix". This stack is next assembled in a first step in a brazing furnace. The matrix generally comprises a first and last plate with a greater thickness than the pieces of sheet metal.

To seal the matrix over its perimeter, bars, called "closing bars," are generally fastened on the matrix. Fluid supply heads are next added to the matrix to form the exchanger.

Due to the expansion differentials between the parts, which prevent excessively geometrically stressing the components of the future exchanger, several brazing steps are generally carried out, between which machining operations are done so as to guarantee the play between parts. This practice requires great mastery of the grades of filler alloys so as not to damage the junctions made in the previous step during the following step.

A first method consists of first making a closed or semi-open frame in which an accordion-folded sheet will be inserted to assemble it by brazing a first time. Secondly, a set of these frames is assembled by brazing in order to form the matrix of the exchanger. Third, the connection tubes of the fluids are brazed on the matrix.

A second method consists first of assembling, by brazing, the set of accordion-folded sheets on the set of sheet metal pieces, to which the closing bars oriented longitudinally are optionally joined. Secondly, the faces of the accordion-folded sheets are machined to align them perfectly, in order to assemble them by brazing with the bars of closures oriented transversely. One thus obtains the matrix of the exchanger. Lastly, thirdly, the connection tubes of the fluids are brazed on the matrix.

Furthermore, there is a need, in different industrial sectors, such as the automotive or aeronautics sector, to reduce the bulk created by thermal circuits and their mass, on the one hand, and the quantity of fluids involved in the exchanges, on the other hand. Indeed, these fluids sometimes have an impact on the environment, which must be reduced as much as possible.

However, the smaller the dimensions of the exchangers are, the more difficult the second step is, that is to say, the brazing of the closing bars on the face of the accordion-folded sheets having the interstices described above. One aim of the invention is therefore to provide a brazing or refilling method making it possible to treat parts such as the aforementioned accordion-folded part, having micro-interstices in particular for producing small exchangers.

BRIEF SUMMARY OF THE INVENTION

To that end, the invention relates to a brazing or refilling method, comprising the following steps:

providing at least one part containing at least 90% by mass of a metal or metal alloy, for example stainless steel, the part having at least one face defining a plurality of interstices, the interstices comprising at least two opposite edges separated on the face by a maximum distance of not more than 250 micrometers, preferably less than or equal to 150 micrometers, obtaining a coating in contact with said face, the coating comprising at least a first layer, located at least partially in the interstices, and a second layer adjacent to the first layer, the first layer comprising a first powder comprising, at least at 90% by mass, a metal or metal alloy and having a solidus temperature TSA, the second layer comprising a mixture of a second powder and a third powder, the second powder and the third powder being, respectively, different alloys suitable for brazing or refilling the part, one and/or the other of these alloys for example being a nickel alloy, the second powder having a solidus temperature TSB, and the third powder having a solidus temperature TSC strictly lower than the solidus temperature TSB, heating the part and the coating at a heating temperature strictly lower than the solidus temperature TSA, on the one hand, and lower, preferably strictly lower, than the solidus temperature TSB, and strictly higher than the solidus temperature TSC, and at least partially melting the coating, and cooling the part and the at least partially molten coating, and obtaining a solidified residue attached to the part.

According to specific embodiments, the process includes one or more of the following features, considered alone or according to any technically possible combination(s):

the first powder comprises at least 90% by mass of the same metal or the same metal alloy as the part;

the second powder represents, in said mixture, a proportion by mass of between 60% and 95%, preferably between 70% and 90%, and still more preferably between 75% and 85%, said proportion by mass being before mixing;

the third powder comprises at least 70% by mass of nickel;

the solidified residue extends in said interstices over a depth of between 0.1 mm and 3 mm, preferably between 0.2 mm and 1 mm, and still more preferably between 0.3 and 0.7 mm;

the first powder has a grain size smaller than 150 micrometers, preferably smaller than 44 micrometers;

the second powder and the third powder have a grain size smaller than 212 micrometers, preferably smaller than 105 micrometers;

in the obtainment step, the first layer and the second layer respectively comprise an organic binder, preferably with an aqueous phase, the binders respectively representing between 0.5% and 4% by mass of the first layer, and between 0.2% and 2% by mass of the second layer, the first layer is applied on the part and the second layer is applied on the first layer, the second layer optionally at least partially covering the part (51) not covered by the first layer, and optionally the coating is compacted under a pressure from 0.1 to 6 bars, preferably under a pressure of about 1 bar;

the part is configured to form at least one part of a heat exchanger, the part preferably including at least one metallic sheet folded as an accordion, the metallic sheet defining a plurality of circulation channels for at least two fluids suitable for circulating on each side of the metallic sheet, each circulation channel including an end defining one of the interstices of said face;

the solidified residue completely closes off said interstices; and the third powder having a liquidus temperature TLC, the heating temperature is greater than or equal to the liquidus temperature TLC.

The invention also relates to a heat exchanger comprising at least one part made from stainless steel, the part including at least one face defining a plurality of interstices, the interstices including at least two opposite edges separated by a maximum distance of less than or equal to 250 μm, preferably less than or equal to 150 μm, the part preferably including at least one metallic sheet folded as an accordion, the metallic sheet defining a plurality of circulation channels for at least two fluids suitable for circulating on each side of the metallic sheet, each circulation channel including an end defining one of the interstices of said face, and at least one solidified residue attached on the part, the solidified residue able to be obtained by a method as described above.

BRIEF DESCRIPTION OF THE SEVERAL VIEWS OF THE DRAWING(S

Figure 4:
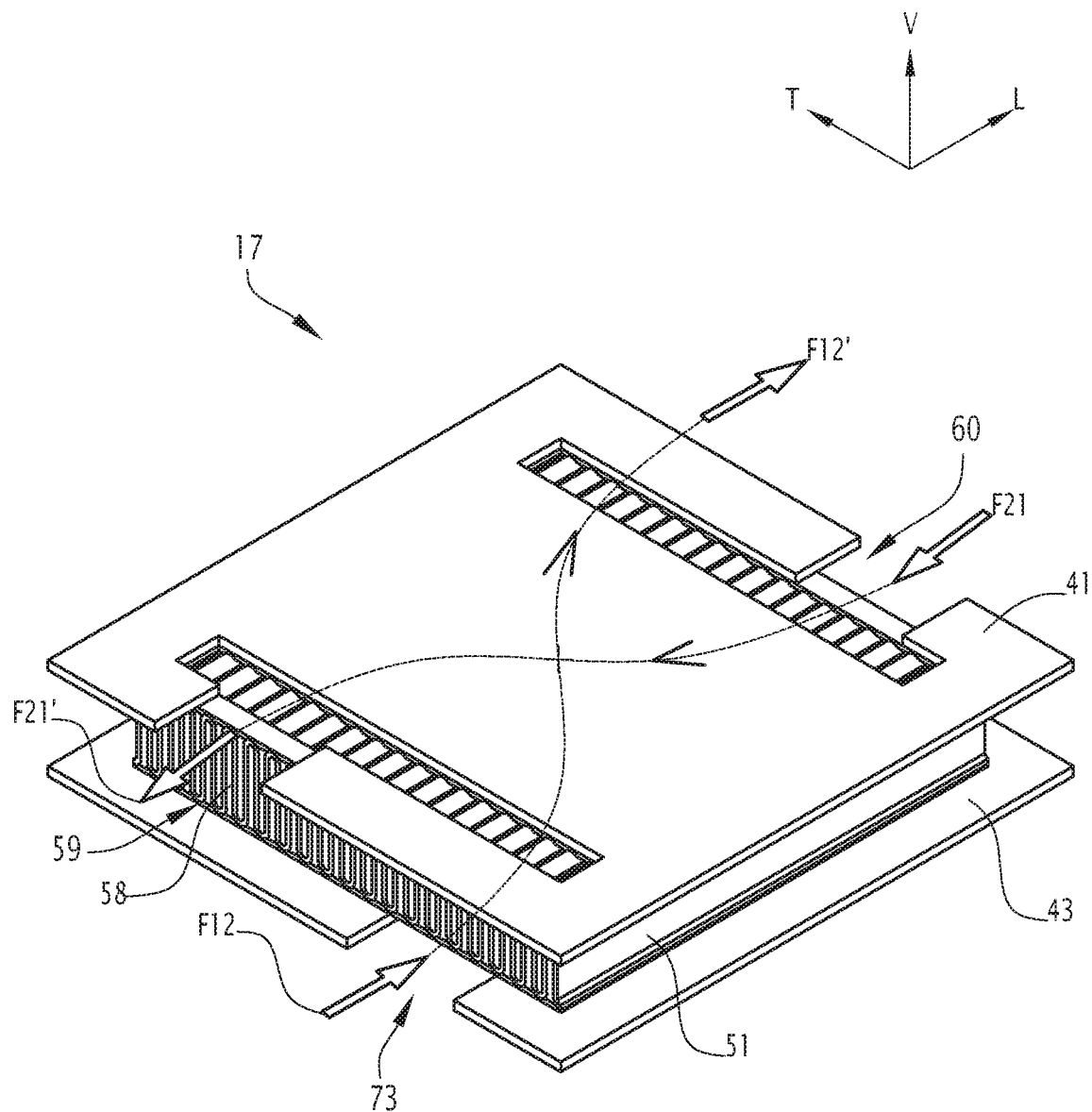
Figure 5:
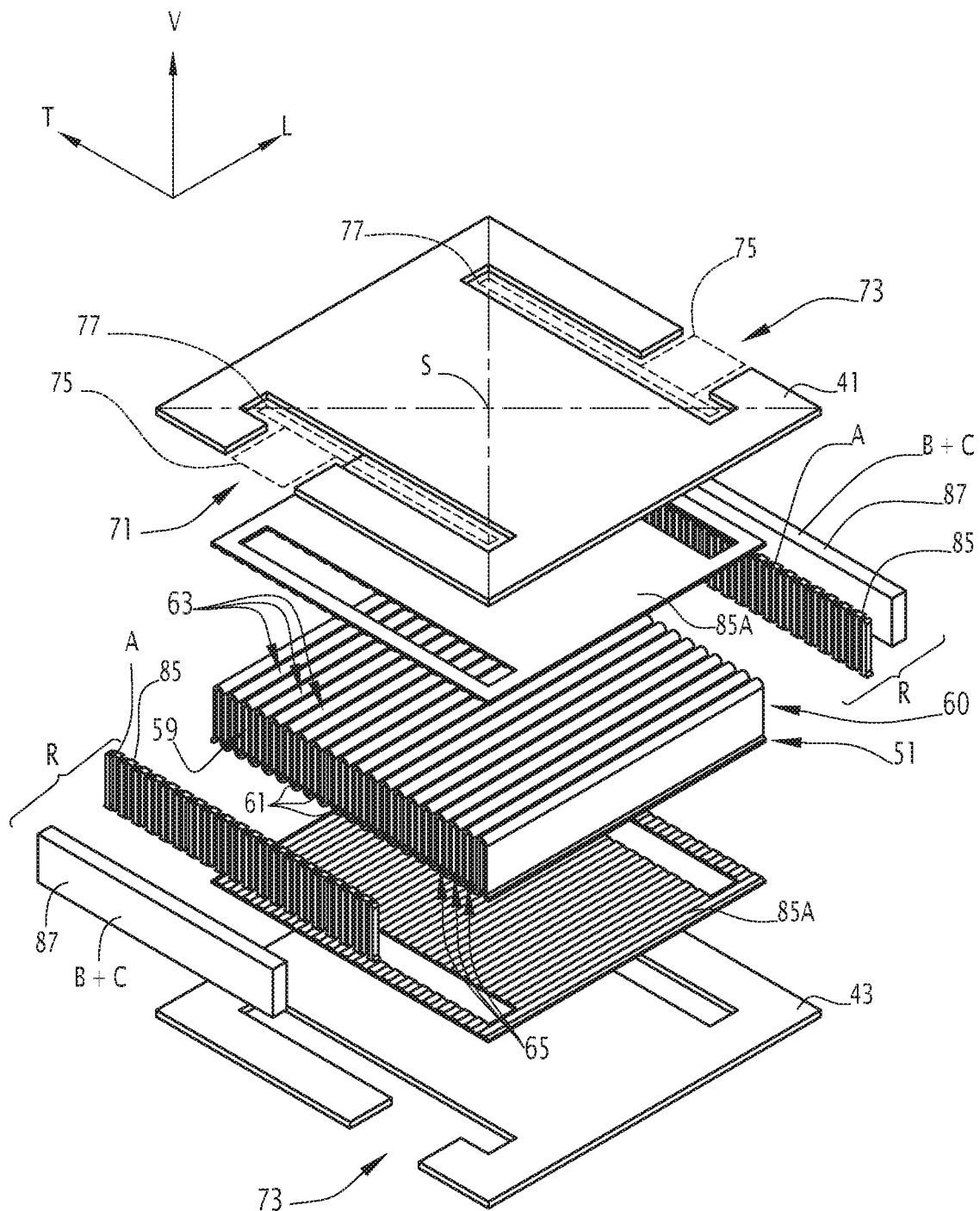

The invention will be better understood upon reading the following description, provided solely as an example, and done in reference to the appended drawings, in which:

FIG. 1 is a perspective view of a heat exchanger according to the invention,

FIG. 2 is a perspective view of the heat exchanger shown in FIG. 1, the fluid collectors having been eliminated, FIG. 3 is a partial front view of the matrix of the exchanger shown in FIGS. 1 and 2, FIG. 4 is a perspective view of one of the stages of the matrix shown in FIG. 3, and FIG. 5 is an exploded perspective view of the stage shown in FIG. 4, and a coating intended to close this level laterally.

DETAILED DESCRIPTION OF THE INVENTION

A heat exchanger 1 according to the invention is described in reference to FIGS. 1 to 3.

As shown in FIG. 1, the exchanger 1 comprises a matrix 5, and four members 7, 9, 11, 13 to respectively supply a cold fluid F1, collect a heated fluid F1', bring a hot fluid F2, and recover a cooled fluid F2'.

The cold fluid is for example water or a mixture of water and glycol.

The hot fluid is for example a refrigerant of the HFE (hydrofluoroether) or HFO (hydrofluoroolefin) type, as is the case in a heat pump. In the case of cooling of the oil of a heat engine, the hot fluid is oil to be cooled.

The matrix 5 for example comprises four stages 15, 17, 19, 21 that are superimposed in a direction V that is for example vertical, and two end plates 23, 25 respectively forming an upper face 27 and a lower face 29 of the matrix.

The matrix 5 is for example parallelepiped. The matrix 5 includes two side faces 31, 33 (FIG. 2) that are opposite in a longitudinal direction L substantially parallel to the direction V, and two side faces 35, 37 that are opposite in a transverse direction T substantially perpendicular to the direction V and the longitudinal direction L.

The side faces 31, 33, 35, 37 are for example rectangular, and two consecutive ones of them around the direction V advantageously form a substantially right angle.

The side face 31 for example forms three inlets E1, E2, E3 for three streams F11, F12 and F13 coming from the cold fluid F1, and two outlets S1', S2' for two streams F21' and F22' suitable for forming the cooled fluid F2'.

The side face 33 includes two inlets (not visible in FIG. 2 because they are located in the rear) for two streams F21 and F22 coming from the hot fluid F2, and three outlets (also not visible in FIG. 2) for three streams F11', F12' and F13' suitable for forming the heated fluid F1'.

As visible in FIGS. 2 and 3, the stages 15, 17, 19, 21 are substantially similar to one another.

The aforementioned inlets and outlets for example take the form of slots extending transversely on the side faces 31, 33.

The inlets E1, E2 and E3 are for example aligned in the direction V and located facing the member 7.

The same is true for the inlets located on the side face 33, except that they are located facing the member 11.

The outlets S1' and S2' are for example superimposed in the direction V and located facing the member 13. The same is true for the outlets located on the side face 33, except that they are located facing the member 9.

The stages 15 to 21 are formed by pieces of sheet metal 39, 41, 43, 45, 47 that are substantially perpendicular to the direction V and alternate with parts 49, 51, 53, 55. The stages are further laterally closed by solidified residues 57 extending between the pieces of sheet metal 39, 41, 43, 45, 47 along the direction V.

In the illustrated example, the parts 49, 51, 53, 55 are similar to one another; therefore, only the part 51 belonging to the stage 17 will be described hereinafter in reference to FIGS. 3 to 5.

The part 51 is made from metal or metal alloy, advantageously stainless steel 316L, and for example 316L. The part 51 is formed by a metallic sheet 58 folded on itself like an accordion along the longitudinal direction L. The part 51 defines a plurality of circulation channels 63 located above the metallic sheet and intended to receive the stream F21, and a plurality of circulation channels 65 located below the metallic sheet and intended to receive the stream F12.

The part 51 includes two longitudinally opposite faces 59, 60, in which the channels 63, 65 define interstices 61.

The interstices 61 include two transversely opposite edges 67, 69 (FIG. 3) separated by a maximum distance D smaller than or equal to 250 μm, preferably smaller than or equal to 150 μm.

The pieces of sheet metal 39, 41, 43, 45, 47 are structurally similar to one another. The pieces of sheet metal 39, 43, 47 have the same spatial orientation, while the pieces of sheet metal 41 and 45 have another spatial orientation, deduced from the first for example by a 180° rotation around the longitudinal direction L.

Each of the pieces of sheet metal 39, 41, 43, 45, 47 for example has a generally rectangular shape seen along the direction V. Each of the pieces of sheet metal comprises two cutouts 71, 73 (FIG. 5), which are for example symmetrical relative to one another at a point S located in the center of the piece of sheet metal.

Each of the cutouts 71, 73 comprises a first part 75 extending longitudinally from one of the side faces 31 or 33 of the matrix 5, and a second part 77 extending transversely above circulation channels 63, or below circulation channels 65.

According to variants that are not shown, each of the cutouts 71, 73 comprises a first part 75 extending transversely from one of the side faces 35 or 37 of the matrix 5, and a second part 77 extending transversely in the extension of the first part 75, above circulation channels 63, or below circulation channels 65.

The pieces of sheet metal 39, 41, 43, 45, 47 are made from metal or metal alloy, for example stainless steel, advantageously 316L. The pieces of sheet metal are respectively attached on the parts 49, 51, 53, 55, for example by conventional brazing.

The members 7, 9, 11, 13 are advantageously similar to one another. Therefore, only the member 7 will be described in detail hereinafter.

The member 7 is made from metal or metal alloy, for example stainless steel, advantageously 316L. The member 7 comprises a tubular upper part 79, and a lower part 81 located in the extension of the first part along the direction V and obtained by cutting in a plane corresponding to the upper face 27 and in a plane corresponding to the side face 31. The member 7 further comprises a bottom 83.

The manufacture of the exchanger 1 will now be described. It implements a brazing method according to the invention.

One first provides the parts 49, 51, 53, 55, as well as the intercalary pieces of sheet metal 39, 41, 43, 45, 47, the end plates 23, 25 and the members 7, 9, 11, 13.

The elements are stacked as shown in FIGS. 3 and 4 in the direction V, by insertion between each of the brazing sheets 85A as shown in FIG. 5.

The brazing sheets 85A are made from brazing alloy, for example Bni-2 alloy.

The assembly of the parts 49, 51, 53, 55, pieces of sheet metal 39, 41, 43, 45, 47 and end plates 23 and 25 is done by stacking, and mechanically maintained owing to suitable tooling (not shown).

A coating R is then made on each side face of the parts 49, 51, 53, 55, respectively between the pieces of sheet metal 39, 41, 43, 45, 47 in the direction V. In particular, the coating R is in contact with the faces 59, 60 including the interstices 61.

Lastly, the assembly and the coating R are heated to a heating temperature TF in order to melt the coating R at least partially.

After cooling, the solidified residue 57 is obtained.

The members 7, 9, 11, 13 are next attached on the matrix 5 by brazing, welding, gluing or any other method suitable for the future usage conditions of the exchanger.

According to another, more economical embodiment, the members 7, 9, 11, 13 are placed on the set formed by the assembly and the coating R, before the new assembly thus formed is heating, then cooled. This makes it possible to obtain an exchanger at the end of a single brazing cycle.

In order to obtain the coating R, in the illustrated example, a first layer 85 (FIG. 5) is applied on each of the parts 49, 51, 53, 55, and a second layer 87 is applied on the first layer.

In a variant, the coating R is only present on the side faces 31 and 33. Indeed, the side faces 35 and 37 do not, in the described example, have micro-interstices.

According to one specific embodiment (not shown), the second layer 87 covers at least a portion of the parts 49 to 55 not covered by the first layer 85.

The second layer 87 for example has a thickness from 1 to 10 times the thickness of the first layer 85.

Optionally, the coating R is compacted under a pressure from 0.1 to 6 bars, preferably under a pressure of about 1 bar, for example by vacuum drawing of the formed set, after the set has been placed in a flexible and airtight membrane (not shown).

The first layer 85 is located at least partially in the interstices 61, and is preferably driven into the accordion-folded metallic sheet. In other words, the first layer 85 penetrates the interstices 61 along the longitudinal direction L.

The first layer 85 comprises, advantageously at least at 90% by mass, a first powder A made up of a metal or a metal alloy and having a solidus temperature TSA (temperature at which the first drop of liquid appears when the first powder A is heated) strictly greater than the heating temperature TF. In other words, the first powder A is non-fusible at the heating temperature TF of the method according to the invention.

If the first powder A is a pure material, of course the solidus temperature TSA is the melting temperature of the pure material.

Advantageously, the first powder A comprises, at least at 90% by mass, the same metal or the same metal alloy as the parts 49 to 55, that is to say, the stainless steel 316L in the example.

The first powder A has grains with a size for example smaller than 150 μm, preferably smaller than 44 μm.

Advantageously, in the first layer 85, the first powder A is mixed with an organic binder, preferably with an aqueous base, representing between 0.5% and 10%, advantageously between 0.5% and 4% by mass of the first layer 85.

The second layer 87 advantageously comprises, at least at 90% by mass, a mixture of a second powder B and a third powder C. Advantageously, the second layer 87 also comprises an organic binder, preferably with an aqueous base, for example representing between 0.5% and 10%, advantageously between 0.2% and 2% by mass of the second layer 87.

The second powder B and the third powder C are respectively different alloys, each being known by one skilled in the art as being suitable for brazing or refilling the materials from which the parts 49 to 55 are made. One and/or the other of these alloys is (are) for example made from a nickel-based alloy.

The second powder B has a solidus temperature TSB and a liquidus temperature TLB (temperature at which the second powder B becomes completely liquid).

The third powder C has a solidus temperature TSC, and a liquidus temperature TLC.

The solidus temperature TSB is strictly greater than the solidus temperature TSC. The heating temperature TF is strictly greater than the solidus temperature TSC, and lower, preferably strictly lower, than the solidus temperature TSB.

Thus, the third powder C melts at least partially during the heating step, while the second powder B does not melt.

Preferably, the liquidus temperature TLC is lower, preferably strictly lower, than the solidus temperature TSB. Furthermore, the heating temperature TF is then higher, preferably strictly higher, than the liquidus temperature TLC. Thus, all of the third powder C is preferably melted.

In the mixture, the second powder B represents a proportion by mass of between 60 and 95%, preferably between 70 and 90%, and still more preferably between 75 and 85%.

For example, the third powder C comprises at least 70% by mass of nickel. The powder B is for example a nickel-based (for example, about 85%) refill powder, including about 7.5% chromium. The powder C is for example a nickel-based (for example, about 73%) refill powder, including about 15% chromium.

Thus, the solidus temperature TSB is for example 1030° C. The liquidus temperature TLB is for example 1060° C.

The solidus temperature TSC is for example 980° C. The liquidus temperature TLC is for example 1020° C.

The solidus temperature TSA is for example 1370° C. The temperature at which the first powder A is completely liquefied is for example 1400° C.

The second powder B and the third powder C for example have a grain size smaller than 212 μm, preferably smaller than 105 μm.

According to variants that are not shown, one and/or the other of the first layer 85 and the second layer 87 are devoid of binder. Indeed, the presence of binder is not useful in certain situations in which the applied coating does not need to have mechanical coherence before the brazing. This is for example the case when the coating R is deposited on a substantially horizontal surface.

According to other variants, the second coating 87 is deposited on a support surface before the first layer 85.

The solidified residue 57 is present in the interstices 61 over a depth of between 0.1 mm and 3 mm, preferably between 0.2 mm and 1 mm, and still more preferably between 0.3 and 0.7 mm.

Preferably, the heating temperature TF is greater than or equal to the liquidus temperature TLC of the third powder C, that is to say, greater than or equal to 1020° C. in the described example.

In practice, at least half, by mass, of the third powder C is melted, and preferably, as explained above, all of the third powder C.

The operation of the exchanger 1 is deduced from its structure and will now be briefly described.

The cold fluid F1 (FIG. 1) penetrates the member 7. The cold fluid F1 flows along the side face 31 of the matrix 5 and splits into the streams F11, F12 and F13 (FIG. 2).

The streams F11, F12 and F13 enter the matrix 5 through the inlets E1, E2, E3.

The stream F12 passes through the cutout 73 of the piece of sheet metal 43 (FIG. 5). The stream F12 first flows substantially longitudinally through the first part 75 of the cutout 73, then flows substantially transversely into the second part 77, it then penetrates the circulation channels 65 of the part 51 and the circulation channels 63 of the part 53 (FIG. 3). As it flows longitudinally in the distribution channels 63, 65, the cold fluid exchanges heat with the hot fluid F2 respectively located on the other side of each of the parts 51, 53, and cools. The stream F12 leaves the matrix 5 through the face 33 at the cutout 71 of the piece of sheet metal 43.

Likewise, the streams F11 and F13 flow through the matrix 5 from the side face 31 to the side face 33 while exchanging heat countercurrent with the streams F21 and F22.

Once heated, the streams F11, F12, F13 become heated streams F11', F12' and F13' that emerge in the member 9 and combined to form the heated fluid F1'.

Likewise, the hot fluid F2 penetrates the member 11 and splits into the streams F21 and F22, which enter the matrix 5 through the side face 33.

For example, as shown in FIG. 4, the stream F21 penetrates through the cutout 73 of the piece of sheet metal 41 and enters the channels 63 defined by the part 51 and in the channels 65 of the part 49. The streams F21 and F22 cool by heat exchange through the parts 49, 51 on the one hand and 53, 55 on the other hand and exit again in the form of cooled streams F21' and F22'. The streams F21' and F22' combine in the member 13 to form the cooled fluid F2'.

Thus, owing to the features described above, the brazing method makes it possible to create the solidified residue 57 forming a sealed side wall on the faces 59, 60 having the interstices 61, without capillarity forces causing an excessive penetration of the coating R in the interstices during the brazing.

Furthermore, the method allows the manufacture of the exchanger 1 while minimizing the number of brazing steps. This makes it possible to obtain small exchangers, at a reduced cost, and possibly in a single brazing step.

The invention claimed is:

1. A brazing or refilling method, comprising the following steps:
   providing at least one part containing at least 90% by mass of a metal or metal alloy, the part having at least one face defining a plurality of interstices, the interstices comprising at least two opposite edges separated on the face by a maximum distance being less than or equal to 250 micrometers,
   obtaining a coating in contact with said face, the coating comprising at least a first layer located at least partially in the interstices, and a second layer adjacent to the first layer, the first layer comprising a first powder comprising at least 90% by mass of a metal or metal alloy and having a solidus temperature TSA, the second layer comprising a mixture of a second powder and a third powder, the second powder and the third powder being, respectively, different alloys suitable for brazing or refilling the part, the second powder having a solidus temperature TSB, and the third powder having a solidus temperature TSC strictly lower than the solidus temperature TSB,
   heating the part and the coating at a heating temperature strictly lower than the solidus temperature TSA, on the one hand, and lower than the solidus temperature TSB, and strictly higher than the solidus temperature TSC, and at least partially melting the coating, and
   cooling the part and the at least partially molten coating, and obtaining a solidified residue attached to the part.

2. The method according to claim 1, wherein the first powder comprises at least 90% by mass of the same metal or the same metal alloy as the part.

3. The method according to claim 1, wherein the second powder represents, in said mixture, a proportion by mass of between 60% and 95%, said proportion by mass being before mixing.

4. The method according to claim 1, wherein the third powder comprises at least 70% by mass of nickel.

5. The method according to claim 1, wherein the solidified residue extends in said interstices over a depth of between 0.1 mm and 3 mm.

6. The method according to claim 1, wherein:
the first powder has a grain size smaller than 150 micrometers,
the second powder and the third powder have a grain size smaller than 212 micrometers.

7. The method according to claim 1, wherein, in the obtainment step:
the first layer and the second layer respectively comprise an organic binder, the binders respectively representing between 0.5% and 4% by mass of the first layer, and between 0.2% and 2% by mass of the second layer,
the first layer is applied on the part and the second layer is applied on the first layer, the second layer optionally at least partially covering the part not covered by the first layer.

8. The method according to claim 1, wherein the part is configured to form at least one part of a heat exchanger, the metallic sheet defining a plurality of circulation channels for at least two fluids suitable for circulating on each side of the metallic sheet, each circulation channel including an end defining one of the interstices of said face.

9. The method according to claim 1, wherein the solidified residue completely closes off said interstices.

10. The method according to claim 1, wherein, the third powder having a liquidus temperature TLC, the heating temperature is greater than or equal to the liquidus temperature TLC.

11. The method according to claim 1, wherein the part contains at least 90% by mass of stainless steel.

12. The method according to claim 1, wherein one or the other of said alloys of the second powder and the third powder is/are a nickel alloy.

13. The method according to claim 8, wherein the part includes at least one metallic sheet folded as an accordion.

14. A heat exchanger comprising:
at least one part made from stainless steel, the part including at least one face defining a plurality of interstices, the interstices including at least two opposite edges separated by a maximum distance being less than or equal to 250 μm, preferably less than or equal to 150 μm, the metallic sheet defining a plurality of circulation channels for at least two fluids intended to circulate on each side of the metallic sheet, each circulation channel including an end defining one of the interstices of said face, and
at least one solidified residue attached on the part, the solidified residue being able to be obtained by a method according to claim 1.

15. The heat exchanger according to claim 14, wherein the part includes at least one metallic sheet folded as an accordion.

16. The method according to claim 7, wherein the coating is compacted under a pressure from 0.1 to 6 bars.

* * * * *